United States Patent Office 3,462,443
Patented Aug. 19, 1969

3,462,443
INDENO[1,2-c]PYRIDINE DERIVATIVES
Vasken Paragamian, Dresher, Pa., assignor to McNeil
Laboratories, Inc., a corporation of Pennsylvania
No Drawing. Continuation-in-part of application Ser. No.
407,915, Oct. 30, 1964. This application Apr. 19, 1967,
Ser. No. 631,878
Int. Cl. C07d *39/00;* A61k *27/00*
U.S. Cl. 260—294           7 Claims

ABSTRACT OF THE DISCLOSURE

The compounds are of the class of 1,2,3,4,4a,9b-hexahydro-5H-indeno[1,2-c]-pyridines and 1,2,3,4,4a,9b-hexahydro-5H-indeno[1,2-c]pyridin-5-ones which are useful as hypotensive agents.

This is a continuation-in-part application of my copending application, Ser. No. 407,915, filed Oct. 30, 1964 now abandoned.

This invention relates to novel chemical compounds and, more particularly, to indeno[1,2-c]pyridine derivatives having the formulas:

I
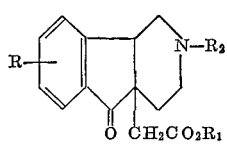

and

II
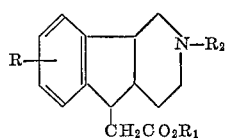

wherein R is a member selected from the group consisting of hydrogen, chloro, lower alkyl, lower alkoxy and trihalomethyl, preferably trifluoromethyl; $R_1$ is a member selected from the group consisting of hydrogen and lower alkyl; and $R_2$ is a member selected from the group consisting of hydrogen, lower alkyl and phenethyl. The therapeutically active non-toxic acid addition salts of the foregoing compounds are also embraced within the scope of this invention.

As used herein, lower alkyl and lower alkoxy may be straight or branch chained and have from 1 to 7 carbon atoms, such as, for example, methyl, ethyl, propyl, isopropyl, butyl, tertiary-butyl, pentyl, hexyl, heptyl and the like, and the corresponding methoxy, ethoxy, propoxy, isopropoxy, butoxy, etc.

As the starting material for the preparation of the subject compounds, one may utilize a compound of the formula:

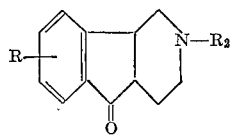

wherein R and $R_2$ are as previously defined. To prepare the compounds of Formula I wherein $R_1$ is lower alkyl, the foregoing starting material III is treated with a substituted acetic acid ester having the formula:

$$X\text{—}CH_2\text{—}COOR_1 \qquad IV$$

wherein $R_1$ is lower alkyl and X is defined as a reactive ester of the corresponding alcohol with a strong inorganic or organic acid, such as hydrochloric acid, hydrobromic acid, sulfuric acid, p-toluene sulfonic acid, methane sulfonic acid and the like. The reaction may be advantageously carried out in a suitable solvent medium in the presence of a base such as, for example, an alkali or alkaline earth metal hydroxide or alkoxide, e.g., sodium hydroxide, potassium hydroxide, sodium ethoxide, potassium tert-butoxide and the like, or in the presence of an alkali metal amide or hydride, e.g., sodamide, lithamide, sodium hydride and the like. Elevated temperatures may be advantageously employed during the reaction. Among the solvents that are operable herein are aromatic hydrocarbons, such as, for example, benzene, toluene, xylene and the like; aliphatic alcohols, such as, for example, methanol, ethanol, isopropanol, tert-butanol and the like; mixtures of said aromatic hydrocarbons and said aliphatic alcohols; and di-lower alkyl ethers of ethylene glycol, e.g., the dimethyl ether, the diethyl ether, and the like. The use of aliphatic alcohols as the solvent medium in conjunction with alkali metal alkoxides as the base is particularly suitable. Subsequent saponification, for example, by conventional mild alkaline hydrolysis, affords the novel compounds of Formula I wherein $R_1$ is hydrogen:

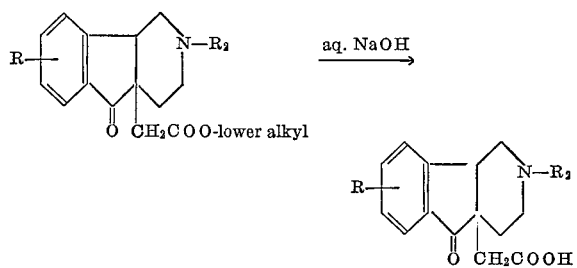

To prepare the compounds of Formula II wherein $R_1$ is lower alkyl, the starting material III is treated with a lower alkyl ester of diethoxy phosphono acetate V followed by reduction of the resulting product. The reaction scheme may be illustrated as follows:

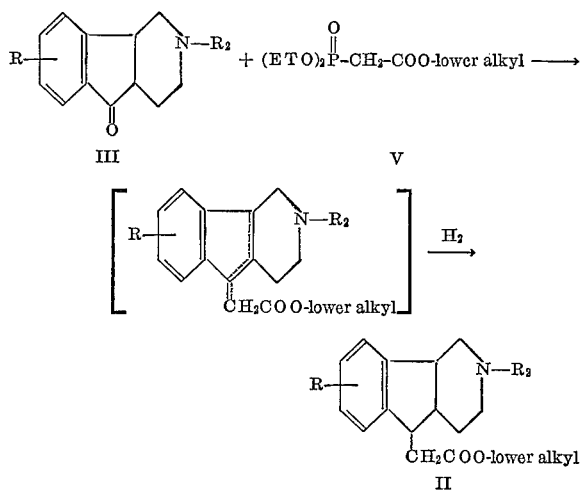

Suitable organic solvents for the reaction of III with V are the aromatic hydrocarbons and di-lower alkyl ethers of ethylene glycol previously described. The reaction is carried out in the presence of a base, such as, for example, an alkali metal hydride, hydroxide or amide. The conversion of the resulting product to II may be accomplished by conventional catalytic reduction techniques with hydrogen.

Subsequent saponification, for example, by conventional mild alkaline hydrolysis, affords the novel compounds of Formula II wherein $R_1$ is hydrogen:

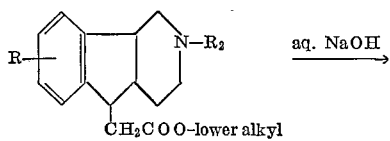

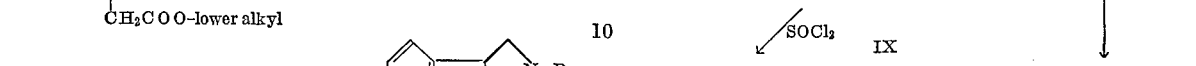

An alternative method of preparing the compounds of Formula II wherein $R_1$ is lower alkyl is through the Reformatsky reaction, that is, by condensation of III with an appropriate α-haloester (halo-$CH_2$COO-lower alkyl) in the presence of zinc. Preferably, refluxing solvents are employed, e.g., ether, benzene, toluene, xylene or mixtures thereof. On completion of the reaction, the product is treated with aqueous acid to hydrolyze the organozinc complex and liberate the corresponding β-hydroxyester which, by subsequent dehydration and catalytic reduction, affords the desired compound of Formula II, wherein $R_1$ is lower alkyl.

Referring to the reaction scheme below, the starting materials III may be prepared by treating an appropriate ester derivative of $N$-$R_2$-tetrahydro pyridinecarboxylic acid VI with an appropriately substituted phenyl magnesium halide VII (Grignard reagent). Variations in $R_2$ for the product VIII may be achieved in the cases where $R_2$ is lower alkyl and phenethyl by starting with the corresponding ester VI; and in the case where $R_2$ is hydrogen by starting with a benzyl group at the $R_2$ position of ester VI and subjecting the resulting Grignard reaction product VIII to hydrogenolysis with hydrogen and a catalyst. The Grignard reaction is carried out in an ether solvent, for example, tetrahydrofuran, diethyl ether, dioxane, dimethyl ether of ethylene glycol (monoglyme), etc., at low temperatures, preferably —10° to 0° C. Acid or base hydrolysis of the resulting product VIII, for example, with mineral acids such as hydrochloric acid, hydrobromic acid, sulfuric acid and phosphoric acid, or alkali or alkaline earth metal hydroxides, in water or aqueous alcoholic solutions, affords IX which may then be converted to III by cyclodehydration achieved under acidic dehydrating conditions, for example, with anhydrous hydrofluoric acid, polyphosphoric acid, etc. Alternatively, IX may be converted to its corresponding acid halide X with such agents as thionyl chloride, phosphorus oxychloride, phosphorous tri- or penta-halide, etc., which may then be cyclyzed to III under Friedel-Crafts conditions.

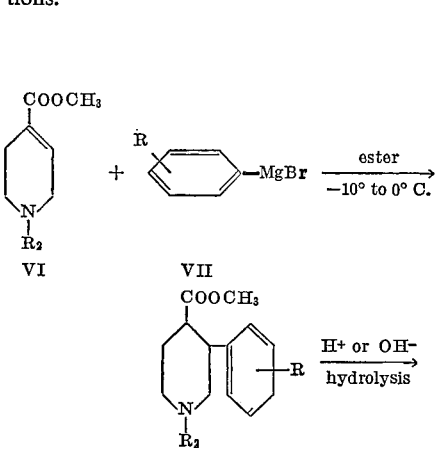

The following compounds, in base form, are representative of those contemplated by this invention and which may be prepared by the procedures discussed herein:

Ethyl 1,2,3,4,4a,9b-hexahydro-2-methyl-5-oxo-5H-indeno[1,2-c]pyridine-4a-acetate,
Methyl 1,2,3,4,4a,9b-hexahydro-2-(β-phenethyl)-5-oxo-5H-indeno[1,2-c]pyridine-4a-acetate,
Ethyl 1,2,3,4,4a,9b-hexahydro-5-oxo-7-chloro-5H-indeno[1,2-c]pyridine-4a-acetate,
1,2,3,4,4a,9b-hexahydro-5-oxo-5H-indeno[1,2-c]pyridine-4a-acetic acid,
1,2,3,4,4a,9b-hexahydro-2-ethyl-5-oxo-7-trifluoromethyl-5H-indeno[1,2-c]pyridine-4a-acetic acid,
1,2,3,4,4a,9b-hexahydro-5-oxo-8-methoxy-5H-indeno[1,2-c]pyridine-4a-acetic acid,
Ethyl 1,2,3,4,4a,9b-hexahydro-2-methyl-5H-indeno[1,2-c]pyridine-5-acetate,
Methyl 1,2,3,4,4a,9b-hexahydro-2-(β-phenethyl)-7-methyl-5H-indeno[1,2-c]pyridine-5-acetate,
Ethyl 1,2,3,4,4a,9b-hexahydro-7-chloro-5H-indeno[1,2-c]pyridine-5-acetate,
1,2,3,4,4a,9b-hexahydro-2,8-dimethyl-5H-indeno[1,2-c]pyridine-5-acetic acid,
1,2,3,4,4a,9b-hexahydro-2-methyl-7-trifluoromethyl-5H-indeno[1,2-c]pyridine-5-acetic acid, and
1,2,3,4,4a,9b-hexahydro-5H-indeno[1,2-c]pyridine-5-acetic acid.

The subject compounds may be isolated as the free bases by synthetic processes normally employed. These compounds, in base form, are convertible to therapeutically active non-toxic acid addition salts by treatment with an appropriate acid, such as, for example, an inorganic acid, such as, hydrohalic acid, e.g., hydrochloric, hydrobromic, hydroiodic acid; sulfuric or nitric acid; a phosphoric acid; an organic acid, such as, acetic, propionic, glycolic, lactic, pyruvic, malonic, succinic, maleic, fumaric, malic, tartaric, citric, benzoic, cinnamic, mandelic, methanesulfonic, ethanesulfonic, hydroxyethanesulfonic, benzenesulfonic, p-toluenesulfonic, salicylic, p-aminosalicylic, 2-phenoxybenzoic or 2-acetoxybenzoic acid. Conversely, the salt form can be converted in the usual manner into the free base.

The 5H-indeno[1,2-c]pyridines represented by formulas (I) and (II) have valuable pharmacological applications in view of their hypotensive activity. A lowering of blood pressure is observed, without deleterious side effects, when the compounds are administered to laboratory animals in either oral or parenteral pharmaceutical forms. As exemplified with ethyl 1,2,3,4,4a,9b-hexahydro-2-methyl-5H-indeno[1,2-c]pyridine-5-acetate, one of the preferred species herein, a fall in blood pressure of about 30 mm. mercury is observed upon intravenous administration to an anesthetized dog at a dose of 16 mg./kg. of body weight. The subject 5H-indeno[1,2-c]pyridines can be administered in therapeutic dosages in conventional vehicles and pharmaceutical forms, for example, tablets, capsules, suspensions, solutions, injectables and the like, which forms can be prepared in accordance with procedures well known in the art.

The nomenclature employed for the compounds of this invention is based upon the ring nucleus:

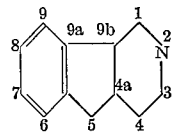

The invention may be illustrated by, although not limited to, the following examples.

EXAMPLE I

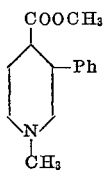

Methyl 1-methyl-3-phenylisonipecotate

To a cooled (−5° C.) solution of phenylmagnesium bromide (prepared from 41.5 g. of magnesium and 270 g. of bromobenzene) is added a solution of 130 g. (0.84 mole) of methyl 1-methyl - 1,2,5,6 - tetrahydro - 4 - pyridinecarboxylate in 500 ml. of ether over a period of 1.5 hr. The resulting mixture is stirred at −5° C. for an additional hour and then passed into a cold ammonium chloride solution. The ether layer is separated, washed with a sodium chloride solution and concentrated to give 175 g. of an orange liquid. Distillation of a 75 g. sample of this crude product yields 5.3 g. of biphenyl and 30.5 g. of a mixture of cis and trans methyl 1-methyl-3-phenylisonipecotate as a yellow liquid, B.P. 114° C./0.5 mm. Gas chromatography indicates the presence of the two ester components in approximately 2:1 ratio. Chromatography of 2.2 g. of the distilled liquid on 60 g. of neutral alumina separates 0.5 g. of the pure ester present in larger amount (ester A, pet. ether eluent) and 0.35 g. of the pure ester present in lesser amount (ester B, 50% ether-pet. ether eluent). Ester B is recrystallized from hexane to give white needles, M.P. 63.5–64.5° C.

Analysis.—Calcd. for $C_{14}H_{19}NO_2$: C, 72.07; H, 8.21; N, 6.00. Found: C, 72.05; H, 8.25; N, 5.94.

The hydrobromide salt of ester A, recrystallized from ethanol-ether, has a M.P. 185–186° C.; white crystals.

Analysis.—Calcd. for $C_{14}H_{19}NO_2 \cdot HBr$: C, 53.51; H, 6.41; N, 4.46. Found: C, 53.39; H, 6.46; N, 4.30.

EXAMPLE II

The procedure of Example I is followed, except that equivalent quantities of appropriate starting materials are utilized for the phenylmagnesium bromide and methyl 1 - methyl - 1,2,5,6 - tetrahydro - 4 - pyridinecarboxylate used therein, to yield as respective products: methyl 1-ethyl-3-phenyl-isonipecotate; methyl 3 - phenylisonipecotate; methyl 1 - (β-phenethyl) - 3 - phenylisonipecotate; methyl 1 - ethyl - 3 - (p - chlorophenyl)isonipecotate; methyl 1 - ethyl - 3 - (p-methoxyphenyl)isonipecotate; methyl 1 - ethyl - 3 - (p-methylphenyl)isonipecotate; and methyl 1 - methyl - 3 - (p-trifluoromethylphenyl)isonipecotate.

EXAMPLE III

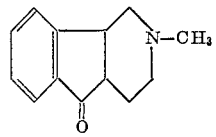

1,2,3,4,4a,9b-hexahydro-2-methyl-5H-indeno[1,2-c]pyridin-5-one

Methyl 1 - methyl - 3 - phenylisonipecotate (130 g., 0.56 mole) is hydrolyzed by reaction with 23 g. (0.58 mole) of sodium hydroxide in refluxing aqueous methanol for 4 hrs. The reaction mixture is made acidic with conc. hydrochloric acid and evaporated to near dryness. The residue is dissolved in ethanol, the undissolved sodium chloride is filtered off, the filtrate is concentrated and the residual oil is dried. The resulting crude 1-methyl-3-phenylisonipecotic acid hydrochloride is added, in portions, to preheated (80–85° C.) polyphosphoric acid (1.5 kilos). After the addition is complete, the mixture is stirred at 115–120° C. for 3 hrs., poured into ice-water, made basic with solid potassium hydroxide, and extracted with chloroform. Drying and removal of the solvent yields the desired ketone as a tan solid. Recrystallization from hexane yields 67 g. (60% yield based on the ester) of a white solid, M.P. 90.5–92° C. A second recrystallization affords an analytically pure product, M.P. 91.5–92.5° C.

Analysis.—Calcd. for $C_{13}H_{15}NO$: C, 77.58; H, 7.51; N, 6.96. Found: C, 77.63; H, 7.54; N, 6.81.

EXAMPLE IV

In accordance with the procedure of Example III, an equivalent quantity of each of the isonipecotic acid esters of Example II is used in place of the methyl 1-methyl-3-phenylisonipecotate of Example III to yield, respectively, the corresponding 1,2,3,4,4a,9b - hexahydro - 5H - indeno[1,2-c]pyridin-5-ones.

EXAMPLE V

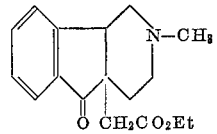

Ethyl 1,2,3,4,4a,9b-hexahydro-2-methyl-5-oxo-5H-indeno[1,2-c]pyridine-4a-acetate To a 5.0 g. suspension of 50% sodium hydride on mineral oil in 150 ml. of monoglyme is added a solution of 20 g. (0.1 mole) of 1,2,3,4,4a,9b-hexahydro-2-methyl-5H-indeno[1,2-c]pyridin-5-one in 120 ml. of monoglyme and the resulting mixture is refluxed for ¾ hrs., cooled and 20 g. (0.12 mole) of ethyl bromoacetate in 50 ml. of monoglyme is added. The entire mixture is then refluxed for 4 hrs., cooled and poured into cold dilute hydrochloric acid and washed with ether. The aqueous layer is then made basic with solid potassium carbonate and extracted with ether. Drying and removal of the solvent leaves 23.2 g. of a dark oil, crude ethyl 1,2,3,4,4a,9b-hexahydro - 2 - methyl - 5 - oxo - 5H - indeno[1,2-c]-pyridine-4a-acetate. A 0.9 g. sample of this oil is converted to its fumarate salt by reaction with 3.6 g. of fumaric acid in methanol. The resulting solid is recrystallized several times from ethanol-ether to give a white solid, M.P. 168.5–170° C.

Analysis.—Calcd. for $C_{17}H_{21}NO_3 \cdot C_4H_4O_4$: C, 62.52; H, 6.25; N, 3.47. Found: C, 62.57; H, 6.30; N, 3.45.

Other acid addition salts are similarly prepared by treating the base-containing crude oil with hydrochloric acid, hydrobromic acid and the like. Conversion of the acid addition salts to the pure base form is accomplished in the conventional manner by treatment with an appropriate alkali such as sodium hydroxide.

EXAMPLE VI

In accordance with the procedure of Example V, an equivalent quantity of each of the carbonyl derivatives of Example IV is used in place of the 1,2,3,4,4a,9b-hexahydro - 2 - methyl - 5H - indeno[1,2 - c]pyridin - 5 - one of Example V to yield, respectively, the corresponding ethyl 1,2,3,4,4a,9b - hexahydro - 5 - oxo - 5H - indeno [1,2-c]pyridine-4a-acetates and the acid addition salts thereof.

EXAMPLE VII

The 4a-acetate esters of Examples V and VI are converted to their corresponding 4a-acetic acid form by conventional hydrolysis under mild alkaline conditions.

EXAMPLE VIII

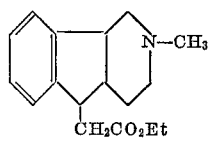

Ethyl 1,2,3,4,4a,9b-hexahydro-2-methyl-5H-indeno [1,2-c]pyridine-5-acetate

To a 5.0 g. suspension of 50% sodium hydride on mineral oil in 150 ml. of monoglyme is added 23.5 g. (0.1 mole) of triethylphosphonoacetate and the resulting mixture is refluxed until the evolution of hydrogen ceases. After cooling, 20 g. (0.1 mole of 1,2,3,4,4a,9b-hexahydro - 2 - methyl - 5H - indeno[1,2 - c]pyridin - 5 - one in 120 ml. of monoglyme is added and the resulting mixture is refluxed for 23 hrs. After cooling, the supernatant solution is separated from the gummy residue and poured into cold dilute hydrochloric acid and washed with ether. The aqueous layer is made basic with solid potassium carbonate and extracted with ether. The ether extracts are dried and the solvent removed, leaving 22 g. of a dark orange oil. This oil exhibits strong bands in the infrared at 1735 cm.$^{-1}$ (ester), 1700 (double bond) and two spots on thin layer chromatography. The oil is hydrogenated in 200 ml. of ethanol with 2 g. of platinum oxide catalyst at room temperature at an initial pressure of 50 p.s.i. for 18 hrs. The catalyst is filtered off and the filtrate concentrated to give a yellow liquid, crude ethyl 1,2,3,4, 4a,9b - hexahydro - 2 - methyl - 5H - indeno[1,2 - c]pyridine-5-acetate which is converted to its fumarate salt by reaction with fumaric acid in methanol. Two recrystallizations of the resulting solid from ethanol-ether yields a white solid, M.P. 173.5–175° C.

*Analysis*—Calcd. for $C_{17}H_{23}NO_2 \cdot C_4H_4O_4$: C, 64.76; H, 6.99; N, 3.60. Found: C, 65.05; H, 7.14; N, 3.48.

Other acid addition salts are similarly prepared by treating the base-containing crude oil with hydrobromic acid, hydrochloride acid and the like. Conversion of the acid addition salts to the pure base form is accomplished in the conventional manner by treatment with an appropriate alkali such as sodium hydroxide.

EXAMPLE IX

In accordance with the procedure of Example VIII, an equivalent quantity of each of the carbonyl derivatives of Example IV is used in place of the 1,2,3,4,4a,9b-hexahydro - 2 - methyl - 5H - indeno[1,2 - c]pyridin - 5 - one of Example VIII to yield, respectively, the corresponding ethyl 1,2,3,4,4a,9b - hexahydro - 5H - indeno[1,2 - c] pyridine-5-acetates and the acid addition salts thereof.

EXAMPLE X

The 5-acetate esters of Examples VIII and IX are converted to their corresponding 5-acetic acid form by conventional hydrolysis under mild alkaline conditions.

What is claimed is:

1. A chemical compound selected from the group consisting of

I. 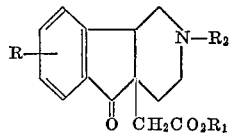

II. 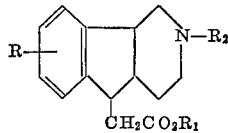

and the therapeutically active non-toxic acid addition salts thereof, wherein R is a member selected from the group consisting of hydrogen, chloro, lower alkyl, lower alkoxy and trifluoromethyl; $R_1$ is a member selected from the group consisting of hydrogen and lower alkyl; and $R_2$ is a member selected from the group consisting of hydrogen, lower alkyl and phenethyl.

2. Ethyl 1,2,3,4,4a,9b - hexahydro - 2 - methyl - 5-oxo-5H-indeno[1,2-c]pyridine-4a-acetate.

3. The fumaric acid addition salt of ethyl 1,2,3,4,4a,9b-hexahydro - 2 - methyl - 5 - oxo - 5H - indeno[1,2 - c] pyridine-4a-acetate.

4. 1,2,3,4,4a,9b - hexahydro - 2 - methyl - 5 - oxo - 5H-indeno[1,2-c]pyridine-4a-acetic acid.

5. Ethyl 1,2,3,4,4a,9b-hexahydro-2-methyl-5H-indeno-[1,2-c]pyridine-5-acetate.

6. The fumaric acid addition salt of ethyl 1,2,3,4,4a,9b-hexahydro - 2 - methyl - 5H - indeno[1,2 - c]pyridine - 5-acetate.

7. 1,2,3,4,4a,9b - hexahydro - 2 - methyl - 5H - indeno [1,2-c]pyridine-5-acetic acid.

References Cited

UNITED STATES PATENTS 2,546,652  3/1951  Plati et al. _____ 260—297
2,408,353  10/1968  Jucker et al. _____ 260—293

HENRY R. JILES, Primary Examiner

G. T. TODD, Assistant Examiner

U.S. Cl. X.R.

260—294.3, 294.7, 999

UNITED STATES PATENT OFFICE
CERTIFICATE OF CORRECTION

Patent No. 3,462,443                                                      August 19, 196

Vasken Paragamian

It is certified that error appears in the above identified patent and that said Letters Patent are hereby corrected as shown below:

Column 3, lines 60 to 65, in Formula VI, "ester" should read -- ether --; same column 3, lines 67 to 75, Formula VII should appear as shown below:

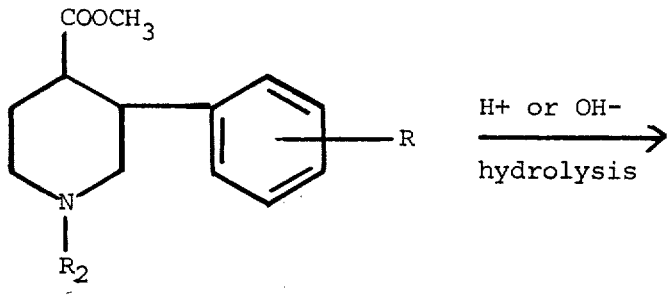

Column 8, line 54, "2,408,353" should read -- 3,408,353 --.

Signed and sealed this 14th day of April 1970.

(SEAL)
Attest:

EDWARD M. FLETCHER, JR.                             WILLIAM E. SCHUYLER, JR.
Attesting Officer                                         Commissioner of Patents